United States Patent [19]

Stephan et al.

[11] 4,432,696
[45] Feb. 21, 1984

[54] ROTOR STRUCTURE FOR A ROTARY WING AIRCRAFT

[75] Inventors: Michael Stephan; Karlheinz Mautz, both of Ottobrunn; Alois Schwarz, Putzbrunn, all of Fed. Rep. of Germany

[73] Assignee: Messerschmitt-Boelkow-Blohm GmbH, Munich, Fed. Rep. of Germany

[21] Appl. No.: 300,378

[22] Filed: Sep. 8, 1981

[30] Foreign Application Priority Data

Sep. 25, 1980 [DE] Fed. Rep. of Germany ....... 3036093

[51] Int. Cl.³ ........................................... B64C 27/35
[52] U.S. Cl. ................................ 416/134 A; 416/136; 416/143; 416/141
[58] Field of Search ............... 416/134 A, 142, 141, 416/143, 136 A, 138 A

[56] References Cited

U.S. PATENT DOCUMENTS

| Re. 30,713 | 8/1981 | Ferris | 416/134 A |
|---|---|---|---|
| 1,969,077 | 8/1934 | Howe | 416/141 |
| 2,549,886 | 4/1951 | Buivid | 416/142 |
| 3,261,407 | 7/1966 | Culver | 416/134 A |
| 3,310,119 | 3/1967 | Watson | 416/138 A |
| 3,926,536 | 12/1975 | Ciastula et al. | 416/141 |
| 4,080,098 | 3/1978 | Watson | 416/141 |
| 4,227,859 | 10/1980 | Gouzien | 416/141 |
| 4,257,738 | 3/1981 | Schwarz | |
| 4,297,080 | 10/1981 | Krauss | 416/141 |

FOREIGN PATENT DOCUMENTS

| 2658828 | 6/1978 | Fed. Rep. of Germany . |
| 2758086 | 6/1979 | Fed. Rep. of Germany . |
| 2806119 | 6/1980 | Fed. Rep. of Germany . |

Primary Examiner—Stephen Marcus
Assistant Examiner—Brian J. Bowman
Attorney, Agent, or Firm—W. G. Fasse; D. H. Kane, Jr.

[57] ABSTRACT

The blade angle of the blades of a rotary wing aircraft is adjusted by a control rod (5) inside the hollow rotor head operating a control shaft (8) extending radially out of the rotor head in axial alignment with the blade angle adjustment axis. The adjustment movement of the shaft (8) is transmitted to the respective blade (3.3) by a yoke (11, 12) and a torsion-stiff sleeve (7) which bridge the blade root (3.1) and the torsion yielding blade neck (3.2) respectively. The blade root (3.1) is connected to the rotor hub (1) by a forked member (2) through which a portion (11) of the yoke extends for connection to the control shaft.

5 Claims, 1 Drawing Figure

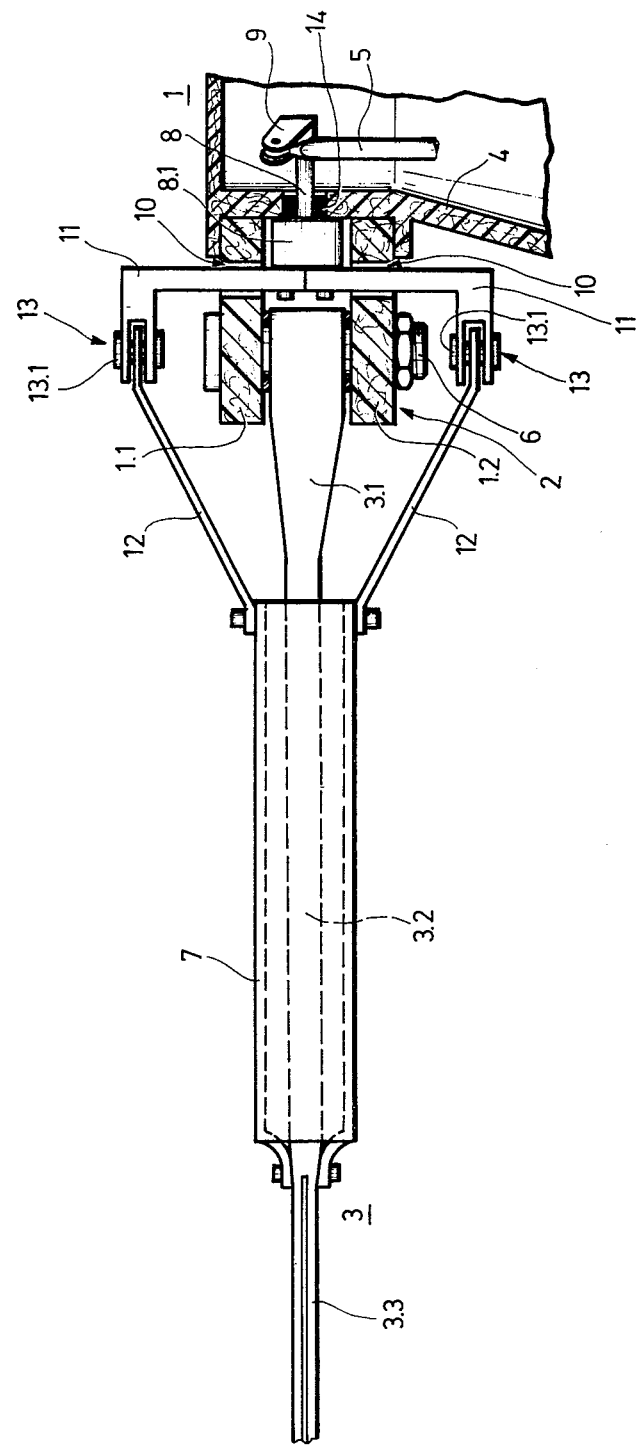

«#» ROTOR STRUCTURE FOR A ROTARY WING AIRCRAFT

CROSS-REFERENCE TO RELATED APPLICATIONS

The present application is based on German Patent Application No. P 30 36 093.1, filed in the Federal Republic of Germany on Sept. 25, 1980. The priority of said German filing date is hereby claimed.

BACKGROUND OF THE INVENTION

The present invention relates to a rotor for a rotary wing aircraft. More specifically the invention relates to a rotor structure for adjusting the blade angle movements about a respective blade angle axis in a rotary wing aircraft in which the rotor blades are secured to the rotor hub in a hingeless and bearingless manner. For this purpose the blades comprise a torsion yielding blade neck section between the blade proper and the respective hingeless and bearingless securing means.

The blade root which connects the torsion yielding neck section to the securing means is stationary as far as blade angle adjustments are concerned. The blade angle adjustment is accomplished by means of a control rod and a torsion stiff connection between the blade proper and the control rod. Such torsion stiff connection comprises a sleeve which extends in parallel to the blade neck section without touching the blade neck section.

Such a rotor is, for example, disclosed in German Patent Publication (DE-OS) No. 2,758,086. The structure of such a rotor is relatively simple because it does not require any blade hinges nor does it require any blade bearings. These features also result in a relatively small structural weight. Additionally, such rotors are capable to withstand wear and tear better than conventional rotors. Thus, the risk of damage in such rotors is low and could be further reduced by using the rotor hub as a protective housing for the blade angle or pitch angle control means as, for example, disclosed in German Patent Publication (DE-OS) No. 2,658,828. However, such construction of the rotor hub encounters the difficulty that the prior art blade control means as integrated into the rotor hub require that the blade root is rotatable relative to the respective blade securing means so that the control rods may be operatively connected to the rotor blades for the pitch angle or blade angle adjustment.

U.S. Pat. No. 4,257,738 discloses a rotor mounting assembly for rotary wing aircraft wherein the blade roots are mounted in bearings for connection to the rotor hub. This reference does not disclose any details regarding the transmission of the force necessary for adjusting the blade angle.

The German Patent Publication (DE-OS) No. 2,658,828 discloses a linkage system for the blade angle or blade pitch angle adjustment of the rotor blades in a helicopter rotor. The present invention aims at using a simpler control linkage for the blade angle adjustment.

A rotor blade or wing with a torsion yielding neck portion is disclosed in German Patent Publication (DE-AS) No. 2,806,119. Such a blade is suitable for the present purposes.

OBJECTS OF THE INVENTION

In view of the above it is the aim of the invention to achieve the following objects singly or in combination:

- to secure the blade root in a fixed manner to the rotor hub while simultaneously permitting the transmission of the blade angle adjustment force from the control rods to the respective blade;
- to arrange the control rod inside the hollow rotor shaft for protection; and
- to connect the wings in such a manner to the hub that the wings may be folded back into a rest or inoperative position without interfering with the blade angle adjustment means.

SUMMARY OF THE INVENTION

According to the invention there is provided a rotor structure for adjusting the blade angle movements about a respective radially extending blade angle axis in a rotary wing aircraft comprising a hollow rotor hub having a rotational axis extending perpendicularly to the blade angle axes. Each wing includes a blade portion, a torsion yielding blade neck including a blade root and hingeless, as well as bearingless securing means for connecting the torsion yielding blade neck, or rather its root to the rotor hub. The blade angle adjustment means comprise a control shaft for each blade supported by a bearing to extend radially out of the rotor hub in axial alignment with the respective blade angle axis. A torsion stiff sleeve is rigidly connected at its radially outer end to the respective blade and so that the torsion yielding blade neck extends axially through the torsion stiff sleeve. Yoke means are arranged to bridge the torsion yielding blade necks or its root for operatively connecting the torsion stiff sleeve at its radially inner end to the control shaft. The control shaft in turn is connected to a control rod in the hollow rotor hub, whereby the torsion stiff sleeve is tiltable or rotatable around the torsion yielding blade neck or root for adjusting the blade angle movements of the respective wing blade.

Compared to the rotor structure disclosed in the above mentioned German Patent Publication No. 2,658,828 the present invention retains the radially outwardly directed rotor arms which are the means for securing the blade root to the rotor hub. However, in addition, the invention provides a control shaft for each control rod, whereby it is no longer necessary to support each blade neck root in a rotatable manner. This is considered to be a substantial improvement because the respective bearings for the blade roots become unnecessary.

In addition to the transmission of the adjustment force from the control shaft to the torsion-stiff sleeve, the structure of the invention makes it possible to fold the wings or blades into a rest position. For this purpose the hingeless and bearingless securing means for the wings are constructed as a double prong fork in which the blade root is received and held by two bolts extending through the prongs and through the blade root. One of the bolts is arranged to extend substantially perpendicularly through the blade angle axis, whereby this one bolt forms the journal for the folding of the rotor blade into a folded rest position. Preferably the yoke connecting the control shaft for the blade angle adjustment to the torsion stiff sleeve extends through vertically aligned slots in the prongs of the blade securing fork and the horizontally extending legs of the yoke are connected to the radially inner end of the torsion stiff sleeve by vertically aligned journal means which are also vertically aligned with the bolt which forms the journal for the blade folding. This structure has the advantage that merely one of the bolts needs to be removed for the folding of the blades and no disassembly is needed for any one of the components in the blade angle adjustment structure.

BRIEF FIGURE DESCRIPTION

In order that the invention may be clearly understood, it will now be described, by way of example, with reference to the accompanying drawing in which the single FIGURE shows a lateral view of a structure according to the invention with portions of the rotor hub and of the hingeless and bearingless blade securing means shown in section.

DETAILED DESCRIPTION OF PREFERRED EXAMPLE EMBODIMENTS AND OF THE BEST MODE OF THE INVENTION

The rotary wing 3 is secured to the hollow rotor head 1 by hingeless and bearingless securing means 2 forming a forked rotor arm for each rotary wing. Each wing 3 comprises three sections, namely a blade root 3.1, a torsionally yielding blade neck 3.2, and the blade 3.3. The structure of the central portion of the rotor head 1 corresponds, for example, to that disclosed in the above mentioned U.S. Pat. No. 4,257,738. There is, however, a difference in that the securing means or rotor arms 2 are directly connected to a hollow hub housing 4 which rotates with the rotor drive shaft not shown. For this purpose the hollow hub housing 4 has an upper flange and a lower flange extending radially for receiving the plates 1.1 and 1.2 forming the hingeless and bearingless wing securing means or rotor arms 2. Further, according to the invention, the blade angle adjustment shaft 8 and the control rod 5 as well as the connecting lever arm 9 are assembled inside the rotor hub 4, whereby these elements are protected. Additional linkage means not shown may correspond to those disclosed in the above mentioned German Patent Publication No. 2,658,828.

The blade root 3.1 reaches into the space between the prongs or plates 1.1 and 1.2 and is connected to these plates forming the rotor arm 2 by two bolts 6, only one of which is shown because the other one looks the same. The bolt 6 extends with its vertical axis in the plane of the drawing and thus substantially perpendicularly to the horizontally extending blade angle adjustment axis of the blade 3. The blade angle adjustment axis extends substantially radially to the vertically extending rotational axis of the rotor hub 4. The bolt 6 functions as a journal for folding the blade 3 into a rest position when the rotor does not rotate. For this purpose the second bolt not shown is simply removed from the plates 1.1 and 1.2.

It is possible to secure the blade root 3.1 to the rotor arm 2 in a hingeless and bearingless manner as just described because the blade or wing neck 3.2 is constructed to be relatively yielding to torsion loads. As mentioned above, such a rotor blade is described in more detail, for example, in German Patent Publication No. 2,806,119. In order to accomplish the necessary blade angle adjustment, a torsion-stiff sleeve 7 bridges the torsion yielding neck 3.2. The radially outer end of the torsion stiff sleeve 7 is rigidly secured to the blade 3.3 to transmit torsion loads through the sleeve 7 to the blade 3.3. The sleeve 7 extends out of contact along the neck 3.2, preferably in a coaxial arrangement. The radially inner end of the sleeve 7 extends substantially all the way to the blade root 3.1 as shown.

The control shaft 8 extends through a bearing 14 radially out of the rotor hub 4. The control force supplied by the control rod 5 through the lever 9 to the shaft 8 is transmitted to the sleeve 7 through yoke means 11 and 12. Thus, the control force is transmitted substantially directly to the sleeve 7. The shaft 8 extends in axial alignment with the blade angle adjustment axis of the wing 3. The lower end of the rod 5 is arranged for cooperation with a drive cam not shown, but operating as a so-called wobble plate. The yoke comprises two lever arms 11 extending substantially in parallel to the rotational axis of the rotor hub 4. The lever arms 11 are rigidly connected to the shaft 8 through a flange 8.1. Each lever arm has a horizontally extending leg 13, the free end of which is forked to hold a journal pin 13.1 and a respective connecting bar 12, the radially outer end of which is rigidly secured to the radially inner end of the torsion stiff sleeve 7. Each blade 3.1 and 3.2 of the rotor arm 2 is provided with a vertically extending slot 10. Both slots are vertically aligned with each other. The yoke levers 11 extend through the respective slots 10. The slots are large enough to permit the blade angle adjustment movement of the yoke levers 11. The yoke levers 11, the vertical axis of the bolt 6, and the rotational axis of the rotor hub 4 thus extend substantially in parallel to one another. Additionally, the journal pins 13.1 extend in axial alignment with the journal axis of the bolt 6. Accordingly, the blades may be folded by merely removing the other bolt not shown. The journal pins 13.1 do not need to be removed for the blade folding. Thus, this structure has minimized the disassembly requirements for the blade folding.

Incidentally, it is not necessary to use two connecting rods 12. One connecting rod 12 and one yoke lever 11 would be sufficient. However, the symmetric double arrangement as shown has the advantage that a pure control torsional movement is transmitted to the sleeve 7 as a result of the blade angle adjustment movement of the shaft 8. Thus, no shearing forces are applied to the sleeve 7. Further, the present teaching is not limited to the type of connection between the blade root 3.1 and the rotor arm 2 as illustrated. Other types of hingeless and bearingless connections are suitable for this purpose. The bearing 14 is preferably a radial elastomeric bearing. This has the advantage that the bearing 14 also serves as a seal between the control shaft 8 and the wall of the hub housing 4 which may, if desired, be filled with transmission fluid.

Although the invention has been described with reference to specific example embodiments, it will be appreciated, that it is intended to cover all modifications and equivalents within the scope of the appended claims.

What is claimed is:

1. A rotor structure for adjusting blade angle movements about a respective radial blade angle axis in a rotary wing aircraft, comprising hollow rotor hub means (4) having a rotational axis, wing means each including a blade and a torsion yielding blade neck (3.2), hingeless and bearingless means (2) for securing said torsion yielding blade neck to said rotor hub means, and blade angle adjustment means comprising control shaft means (8) and shaft operating means (5, 9), said shaft means (8) and said shaft operating means (5, 9) being operatively housed inside said hollow rotor hub means, bearing means (14) secured to said hollow rotor hub means operatively supporting said control shaft means (8) inside said hollow rotor hub means (4) to extend radially out of said hollow rotor hub means (4) in radial, axial alignment with the respective blade angle axis, torsion-stiff sleeve means (7) rigidly connected to the respective blade so that said torsion yielding blade neck (3.2) extends radially and axially through said torsion-stiff sleeve means, yoke means (11, 12) arranged for bridging said torsion yielding blade neck substantially in the direction of said radial blade angle axis, said yoke means operatively connecting said torsion-stiff sleeve means (7) to said control shaft means (8), said shaft operating means (5, 9) inside said hollow rotor hub means being operatively connected to said control shaft means (8) for tilting the torsion-stiff sleeve means (7) around the radial blade angle axis for twisting the torsion yielding blade neck (3.2) to thereby adjust said blade angle movements of the respective wing blade.

2. The structure of claim 1, wherein said hingeless and bearingless securing means comprise a forked member having two prongs (1.1, 1.2) spaced in the direction of said rotational axis, said blade neck having a blade root fitting between said two spaced prongs, and bolt means extending through said prongs and through said blade root for securing the wing means to the rotor hub means.

3. The structure of claim 2, wherein said prongs comprise vertically aligned slots (10), and wherein said yoke means comprise a main section extending in parallel to said rotational axis through said vertically aligned slots permitting said blade angle adjusting movement of said yoke means, and two leg sections (13) extending radially away from said main section (11), each leg section comprising respective hinge means (13.1), said yoke means further comprising connecting rod means operatively connected to a radially inner end of said torsion stiff sleeve means and to the respective hinge means, whereby the blade means are tiltable into a folded position about at least one of said bolt means extending through said prongs of the respective forked member.

4. The structure of claim 1, wherein said bearing means (14) for said control shaft means comprise a bearing made of elastomeric material through which said control shaft (8) extends.

5. The structure of claim 1 or 2, wherein said yoke means (11, 12) comprise two yoke members (11) connected to said control shaft means (8), and two connecting rods (12) operatively connecting said torsion stiff sleeve means (7) to said two yoke members (11) in such a manner that the yoke members (11) and the connecting members (12) are arranged symmetrically relative to said blade angle axis and thus relative to said control shaft means (8).

* * * * *